Aug. 11. 1925.
T. K. STEVENSON
VALVE SPRING COMPRESSOR
Filed May 19, 1924
1,549,230
2 Sheets-Sheet 1
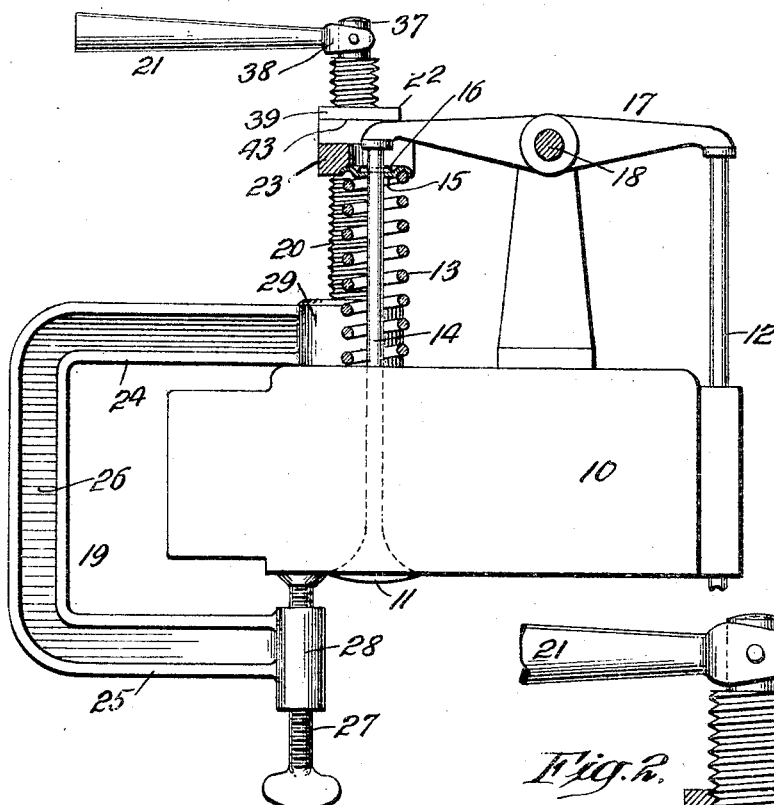
Fig.1.
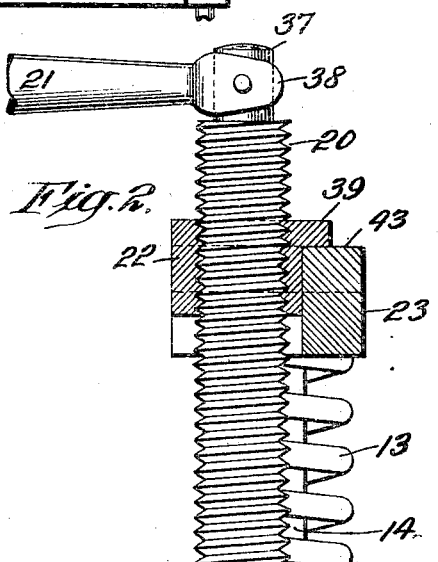
Fig.2.
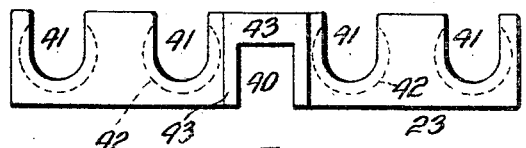
Fig.3.
Fig.4.
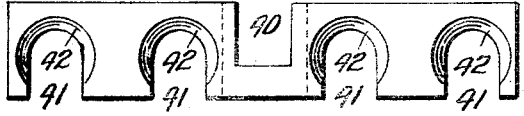
Fig.5.
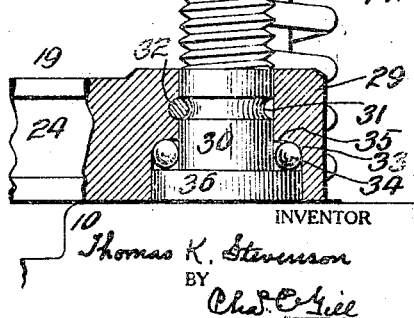
INVENTOR
Thomas K. Stevenson
BY
Chas. E. Gill
ATTORNEY Aug. 11, 1925.
T. K. STEVENSON
1,549,230
VALVE SPRING COMPRESSOR
Filed May 19, 1924 — 2 Sheets-Sheet 2
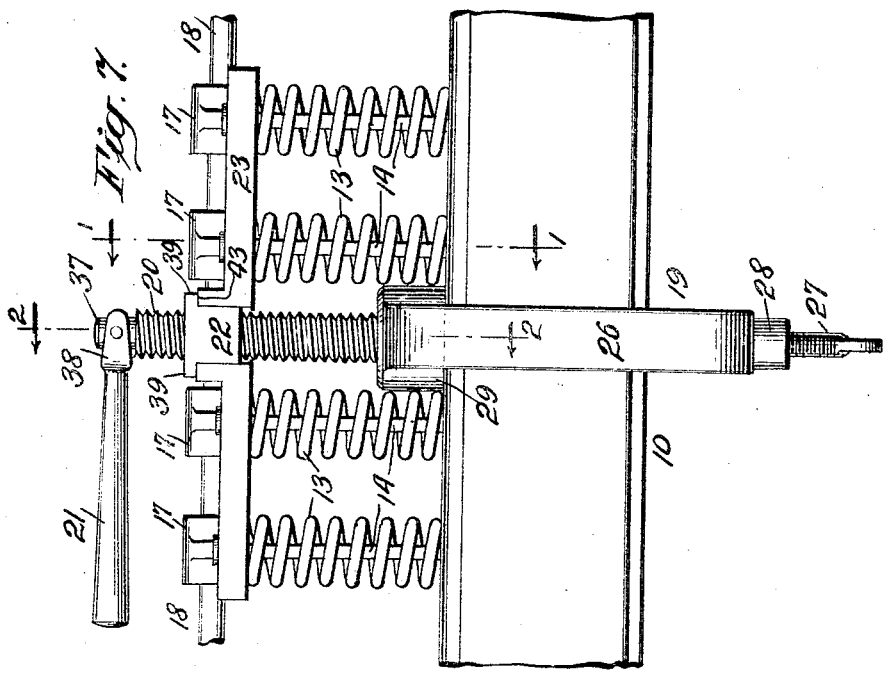
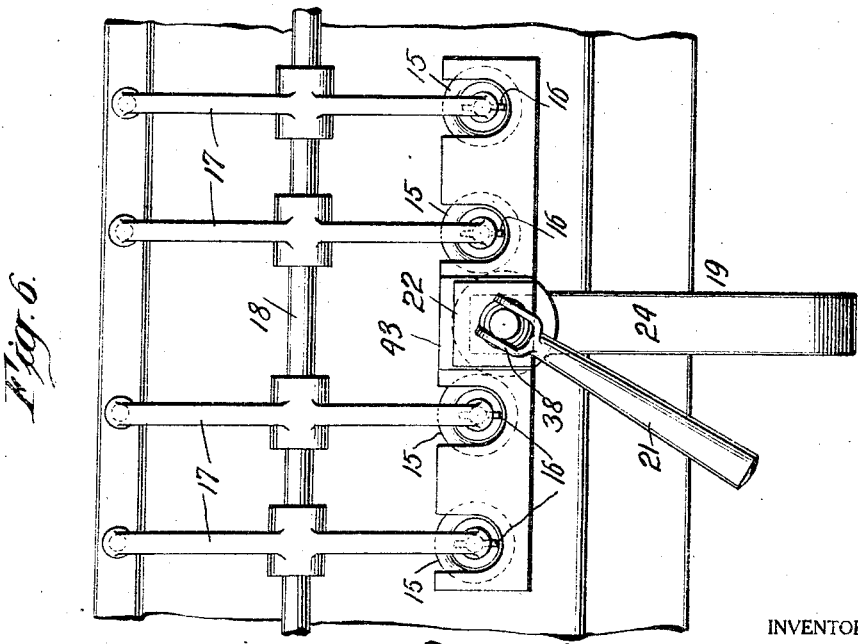
INVENTOR
Thomas K. Stevenson
BY
Chas. C. Gill
ATTORNEY Patented Aug. 11, 1925.

1,549,230

UNITED STATES PATENT OFFICE.

THOMAS K. STEVENSON, OF YONKERS, NEW YORK, ASSIGNOR OF ONE-HALF TO EDGAR MASON GOLDSMITH, OF NEW YORK, N. Y., AND ONE-HALF TO BERNARD CONVISSER, OF YONKERS, NEW YORK.

VALVE-SPRING COMPRESSOR.

Application filed May 19, 1924. Serial No. 714,271.

*To all whom it may concern:*

Be it known that I, THOMAS K. STEVENSON, a citizen of the United States, and a resident of Yonkers, in the county of Westchester and State of New York, have invented certain new and useful Improvements in Valve-Spring Compressors, of which the following is a specification.

The invention relates to valve-spring compressors of a type adapted to "valve-in-head" motors, and it consists in the novel features and combinations of parts hereinafter described, and particularly pointed out in the claims.

One object of my invention is to provide means whereby the valve-springs while undergoing compression while in their compressed state and while expanding to their original condition, are held under perfect mechanical control.

A further object of the invention is to provide a valve-spring compressor of simple, durable and efficient construction and capable of ready operation for compressing a plurality of valve springs.

In carrying out my invention I provide a clamp adapted to be engaged on the head of the motor and carrying a rotary screw on which is provided a special nut to ascend and descend on the screw in accordance with the direction of rotation thereof, and with the device comprising the clamp, screw, nut and a handle on the upper end of the screw for rotating it in either direction, I provide a valve spring plate adapted to be placed over the washers at the upper ends of the valve springs and to be engaged by said nut on the screw for moving said plate downwardly to compress the valve springs and hold them in their compressed state during the period that the valves may be absent from the engine, for regrinding or other purpose, and to gradually release said springs on the upward movement of the said nut after the valves have been restored to the motor head, said springs at all times being under the positive control of the rotary screw and the nut carried thereby. The device of my invention thus consists of two separable parts, one being the clamp, screw and nut, and the other being the valve spring plate to be placed on the springs and engaged by said nut. The parts of the device are of extreme durablity and in addition are novel in their details.

The invention will be fully understood from the detailed description hereinafter presented, reference being had to the accompanying drawings, in which:

Fig. 1 is an end view of the head of a motor or engine having applied thereto the valve-spring compressor of my invention, one of the valve springs and the valve spring plate of my valve spring compressing tool being indicated in vertical section on the dotted line 1—1 of Fig. 7;

Fig. 2 is a vertical section, on a larger scale and partly broken away, through the same taken on the dotted line 2—2 of Fig. 7;

Fig. 3 is a top elevation of the valve-spring plate constituting a portion of my device Fig. 4 is a front edge view of the same;

Fig. 5 is a bottom view of the same;

Fig. 6 is a top view of a portion of the engine, with the valve spring compressor of my invention applied thereto, and Fig. 7 is a front view of the same.

In the drawings, 10 designates a motor head of known type having the usual valves 11 operable in one direction by push-rods 12 and in the opposite direction by valve-springs 13 mounted on the head 10 and encompassing the stems 14 of the said valves, said springs being confined at their upper ends by usual washers 15 retained on the stems 14 by transverse pins or keys 16 extending through the stems above said washers. Rocker arms 17 mounted on a shaft 18 engage at their respective ends the upper ends of said rods 12 and valve stems 14. The engine parts thus far identified form no portion of my invention and are illustrated as an aid to an understanding of my invention which resides in the means hereinafter described for compressing and holding compressed the valve-springs 13 preparatory to the withdrawal of the pins or keys 16 and the removal of the valves 11 for regrinding or other purposes.

The valve spring compressor of my invention comprises a clamping frame 19, a vertical rotary screw 20 having an operating handle 21 on its upper end, a nut 22 on said screw and adapted to ascend and descend thereon as the screw is rotated clockwise or counter-clockwise from said handle and a valve spring plate 23 adapted to be mounted upon the aforesaid washers 15 on the upper ends of the springs 13 and to be engaged by said nut for forcing the same downwardly to compress the springs, for holding said plate stationary in opposition to the tension of the springs when compressed and for permitting said plate to gradually ascend to relieve the springs 13 after the valves have been restored to operative position in the head.

The clamping frame 19 comprises upper and lower horizontal arms 24, 25 connected by a vertical member 26 and adapted to be inserted over the edge of the head 10 and to be firmly attached to the head by means of a clamping screw 27 extending through a threaded sleeve 28 formed on the outer end of the arm 25.

The free end of the arm 24 is of the special construction shown more clearly in Fig. 2, said end being of hub formation, as indicated at 29, and vertically apertured to receive the lower cylindrical end 30 of the screw 20, said end 30 being annularly grooved, as at 31, to engage a pin 32 driven through the hub 29 along said groove 31 for the purpose of keying the screw 20 to the hub 29 without interfering with the rotation of the screw. Within the hub 29 is formed a raceway 33 for ball-bearings 34, and said hub is formed with an annular shoulder 35 overhanging the bearing-balls 34. The balls 34 are confined within the raceway 33 by a plug 36 fitting within the lower end of the opening through the hub 29. The balls 34 engage the vertical sides of the cylindrical end 30 of the screw 20 and facilitate the free rotation of said screw under the action of the handle 21. The hub 29 serves as a base supporting the screw 20 and is adapted to rest upon the top of the head 10, as shown in Figs. 1 and 2.

The screw 20 is a vertical threaded shaft having a reduced upper end 37, and the handle 21 has a fork 38 straddling and pivotally secured to said end 37 of the screw.

Upon the screw 20 is the operating nut 22 which, in use, is held against rotation, but free to travel upwardly or downwardly on the screw 20 according as said screw is rotated clockwise or counter-clockwise from the handle 21. The nut 22 is formed at its upper portion with lateral shoulders 39, and below these shoulders 39 the nut 22 has plain vertical surfaces.

The valve-spring plate 23 is a durable metal bar having a forwardly-opening central recess 40 and a series of rearwardly-opening recesses 41 spaced apart in accordance with the spacing of the valve-springs 13 with which they are to cooperate. The recesses 41 open rearwardly so that they may be introduced above the washers 15 on the springs 13 or to the position shown in Fig. 1, and preferably the plate 23 at the lower margins of said recesses 41 are concaved, as at 42, to firmly seat upon the convex edge portions of the washers 15. The valve-spring plate or bar 23 is formed with an elevated seat 43 extending along the sides and rear end of the central recess 40, the plate or bar 23 at this seat 43 being thicker than at those portions thereof at opposite sides of said seat 43. The elevated seat 43 of the valve-spring plate 23, when the device is in use, is engaged by the lateral flanges 39 of the nut 22, while the body of said nut 22 is closely confined within the recess 40.

In the employment of my invention the valve-spring plate 23 is introduced above the washers 15 located on the upper ends of the springs 13, the recesses 41 enabling said plate to straddle the several valve stems 41 and pass inwardly to a sufficient extent to properly engage said washers 15, and thereupon the clamping-frame 19 is applied to the head 10, with the nut 22 on the screw 20 sliding into the recess 40 of the valve-spring plate 23 or to the position shown in Fig. 7, whereupon the attendant will operate the screw 20, by means of the handle 21 to cause the nut 22 to descend on the screw and at its flanges 39 to press downwardly against the seat 43 of the valve-spring plate 23 and move said plate downwardly. The continued downward movement of the nut 22 due to the continued rotation of the screw 20, results in the nut 22 forcing the valve-spring plate 23 downwardly until all of the springs 13 have become properly compressed, and thereupon the handle 21 may be released and the operator will abstract the pins or keys 16 from the valve stems 14 so as to permit of the withdrawal of the valves 11 from the head 10. During the absence of the valves 11 the springs 13 will remain compresed by the plate 23, nut 22 and screw 20. After the valves 11 have been returned to the head 10 and the pins or keys 16 have been replaced in the stems 14, the screw 20 will be reversely rotated by means of the handle 21 to effect the elevation of the nut 22 on the screw 20, and as said nut 22 rides upwardly the springs 13 will press the valve spring plate 23 against the shoulders 39 of said nut so that said plate will follow the nut and permit the springs 13 to expand or relax to their original state, with the washers 15 arrested against the transverse pins or keys 16. After the springs 13 have relaxed, the clamp 19 may be loosened and withdrawn from the head 10 and the plate 23 withdrawn from over the washers 15. I have specified that the valve-spring plate 23 is first inserted over the washers 15 on the springs 13 and that the remaining portion of the device is then applied to the head 10, but if preferred the plate 23 and clamp 19 may together be applied to said head.

I do not limit my invention to all the details of form and construction hereinbefore described, since I am aware that the same is capable of modification or variation without departure from the spirit of my invention and within the scope of the appended claims.

I call attention to the fact that the body of the tool and the plate 23 are separable from each other and that the plate 23 may be variously constructed to suit the requirements of various motors without alteration in the screw 20 or nut 22. It is the intention to utilize the tool in connection with various motors and to provide plates 23 adapted to the different motors.

What I claim as my invention and desire to secure by Letters Patent, is:

1. A valve-spring compressor comprising a valve-spring plate adapted to be inserted over and engage the washers on the upper ends of the valve springs of a motor, and means for moving said plate downwardly to compress said springs and hold the same under compression, comprising a vertical rotary threaded shaft or screw, a base member carrying and supporting the same, means on the screw for rotating it in either direction and an operating nut on said screw having a bearing on said plate, said nut when said screw is rotated in one direction being adapted to ride downwardly thereon for moving said plate downwardly to compress the springs and when the screw is reversely rotated, to ride upwardly thereon to permit said springs to expand and cause said plate to follow said nut upwardly.

2. A valve-spring compressor as claimed in claim 1, in which said valve-spring plate has a plurality of rearwardly-opening recesses to straddle the valve stems of the motor and a frontwardly-opening recess to receive said operating nut.

3. A valve-spring compressor as claimed in claim 1, in which said valve-spring plate has a plurality of rearwardly-opening recesses to straddle the valve stems of the motor and a frontwardly-opening recess to receive said nut, said frontwardly-opening recess having about it a raised seat and said nut having at its upper portion laterally extending shoulders to bear upon said seat.

4. A valve-spring compressor for motors of the "valve-in-head" type comprising a clamping frame adapted to be passed over the edge of the head of such motor and be clamped to said head, a base-member carried by said frame to bear upon the upper surface of said head, a vertical threaded shaft or screw mounted in said base member and adapted to be rotated in either direction, a recessed valve-spring plate adapted to be introduced over and engage the washers on the upper ends of the valve-springs in such head and threaded means on said screw and associated with said plate and adapted when the screw is rotated in one direction to move said plate downwardly to compress said springs and when rotated in the reverse direction to relieve the pressure of the plate from said springs and permit said springs to expand to their former condition.

Signed at New York city, in the county of New York, and State of New York, this 17th day of May, A. D. 1924.

THOMAS K. STEVENSON.